United States Patent
Cai et al.

(10) Patent No.: US 9,712,392 B2
(45) Date of Patent: Jul. 18, 2017

(54) SIP ENDPOINT CONFIGURATION IN VOIP NETWORKS

(75) Inventors: Yigang Cai, Naperville, IL (US); Alexander Aihao Yin, QingDao (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1819 days.

(21) Appl. No.: 11/934,771

(22) Filed: Nov. 3, 2007

(65) Prior Publication Data

US 2008/0317004 A1  Dec. 25, 2008

(30) Foreign Application Priority Data

Jun. 20, 2007 (CN) .......................... 2007 1 0111906

(51) Int. Cl.
*H04L 12/24* (2006.01)
*H04L 29/06* (2006.01)

(52) U.S. Cl.
CPC ............ *H04L 41/12* (2013.01); *H04L 41/082* (2013.01); *H04L 41/0806* (2013.01); *H04L 41/0886* (2013.01); *H04L 41/5087* (2013.01); *H04L 65/1006* (2013.01); *H04L 65/1059* (2013.01)

(58) Field of Classification Search
USPC ......... 370/352, 401, 166; 709/220; 713/171, 713/201; 379/93.02
See application file for complete search history.

(56) References Cited

U.S. PATENT DOCUMENTS

| | | | |
|---|---|---|---|
| 7,830,823 B2* | 11/2010 | Holloway | H04L 65/1073 370/260 |
| 9,036,618 B1* | 5/2015 | Kosteva | H04L 29/06027 370/352 |
| 2002/0126654 A1* | 9/2002 | Preston et al. | 370/352 |
| 2003/0084173 A1* | 5/2003 | Deleu | H04L 29/12009 709/229 |
| 2005/0055576 A1* | 3/2005 | Mononen et al. | 713/201 |
| 2007/0061575 A1* | 3/2007 | Bennett | 713/171 |
| 2007/0130345 A1* | 6/2007 | Da Palma et al. | 709/227 |
| 2007/0263552 A1* | 11/2007 | Mamakos | H04L 41/0213 370/254 |
| 2007/0268506 A1* | 11/2007 | Zeldin | H04L 41/0806 358/1.13 |
| 2007/0268515 A1* | 11/2007 | Freund | H04L 67/34 358/1.15 |
| 2008/0046735 A1* | 2/2008 | Nedeltchev | H04L 63/0823 713/173 |
| 2008/0075245 A1* | 3/2008 | Pearson | H04M 3/42161 379/88.13 |
| 2008/0075255 A1* | 3/2008 | Nguyen et al. | 379/202.01 |
| 2008/0130844 A1* | 6/2008 | Hubbard et al. | 379/93.02 |

(Continued)

*Primary Examiner* — Khaled Kassim
(74) *Attorney, Agent, or Firm* — Duft Bornsen & Fettig, LLP

(57) ABSTRACT

VoIP networks and methods are disclosed for configuring SIP endpoints of VoIP networks. An application server of a VoIP network identifies an endpoint configuration for the SIP endpoints, and generates a configuration command based on the endpoint configuration. The application server formats a SIP message to include the configuration command, and transmits the SIP message to the SIP endpoints. Responsive to receiving the SIP message, the SIP endpoints process the SIP message to identify the configuration command, and set local configuration parameters based on the configuration command.

17 Claims, 5 Drawing Sheets

(56) References Cited

U.S. PATENT DOCUMENTS

| | | | |
|---|---|---|---|
| 2008/0151878 A1* | 6/2008 | Liao | H04L 65/1006 370/356 |
| 2008/0165762 A1* | 7/2008 | Gilfix et al. | 370/352 |
| 2008/0175224 A1* | 7/2008 | Andrews | H04L 12/66 370/352 |
| 2008/0244709 A1* | 10/2008 | George | H04L 65/1006 726/4 |
| 2008/0279119 A1* | 11/2008 | Stille et al. | 370/261 |
| 2008/0317020 A1* | 12/2008 | Horne | H04L 29/12509 370/389 |
| 2009/0083400 A1* | 3/2009 | Draca et al. | 709/220 |
| 2009/0216862 A1* | 8/2009 | Seeman | H04L 29/06 709/220 |

* cited by examiner

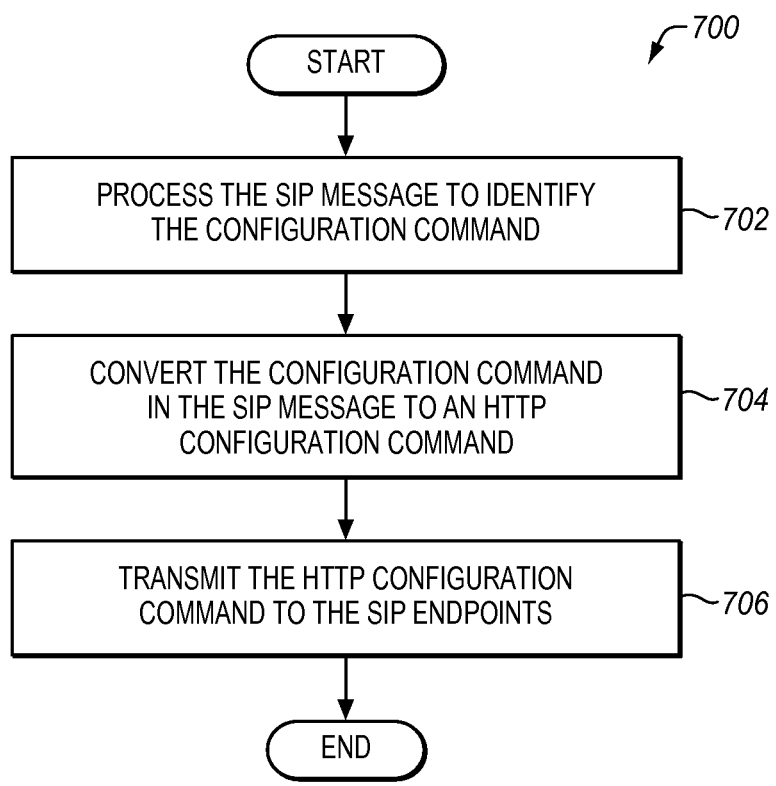

SIP ENDPOINT CONFIGURATION IN VOIP NETWORKS

RELATED APPLICATIONS

This patent application claims priority to a foreign patent application filed in the Chinese Patent Office, having the application number 200710111906.0 and filed on Jun. 20, 2007.

BACKGROUND OF THE INVENTION

1. Field of the Invention

The invention is related to the field of communication networks and, in particular, to configuring SIP endpoints of a VoIP network through SIP messaging.

2. Statement of the Problem

Voice over Internet Protocol (VoIP) is a technology used for the routing of voice conversations over a data network using Internet Protocol (IP). The data network may be the Internet or any other IP-based network, such as an enterprise intranet. VoIP networks are typically viewed as a lower cost alternative to traditional public switched telephone networks (PSTN).

A typical VoIP network is comprised of one or more application servers and a plurality of endpoints. The endpoints are network elements used to originate or terminate a call over the VoIP network, such as a VoIP phone, a PDA, a computer with VoIP functionality, etc. The application server provides call processing within the VoIP network to allow the endpoints to place and receive calls over the VoIP network. The protocol typically used between the endpoints and the application server for call setup, maintenance, and call tear-down is Session Initiation Protocol (SIP), although other protocols may be used. The protocol typically used for data transfer over the VoIP network (i.e., bearer traffic for a VoIP call) is Real-time Transport Protocol (RTP), although other protocols may be used.

Unlike traditional analog phones, endpoints of a VoIP network need to be configured to connect to the VoIP network. The endpoints have local configuration parameters that need to be set by the network operator, by the user of the endpoint, or another party or system. Examples of local configuration parameters that need to be set include a SIP application server IP address, SIP timers, audio/video compression/decompression (CODEC), etc. The endpoints typically provide a local configuration interface through which the user of the endpoint or a network operator can set or adjust the configuration parameters of the endpoint. The local configuration interface may be a menu-based or window-based interface that allows a user to enter values for the configuration parameters.

One problem with configuring endpoints of a VoIP network through their local configuration interface is that each endpoint has to be configured individually. This can place an undue burden on the users or the network operators to manually configure each endpoint. Assume for instance that a VoIP network includes thousands of endpoints and a global configuration change is desired for the endpoints. According to present configuration methods, each endpoint would have to be configured one-by-one through the local configuration interface of each endpoint, which is inefficient.

Some VoIP networks allow for remote configuration of endpoints through an HTTP-based provisioning server (or provisioning center). Through the provisioning server, a user or network operator enters changes to configuration parameters into a web-based interface for the endpoint, and the provisioning server transmits an HTTP configuration command to the endpoint. The endpoint then changes its local configuration parameters based on the HTTP configuration command. Unfortunately, each endpoint still has to be configured one-by-one through the provisioning server. The efficiency of configuring the endpoints through the provisioning server is as poor as configuring the endpoints through their local configuration interfaces.

SUMMARY OF THE SOLUTION

Embodiments of the invention solve the above and other related problems by configuring a plurality of endpoints of a VoIP network through SIP messaging. An application server of the VoIP network, that is serving a plurality of endpoints, is able to embed a configuration command in SIP messages that are transmitted to the endpoints. Responsive to receiving the SIP messages, the endpoints set their local configuration parameters according to the configuration command that was embedded in the SIP message. The application server acts as a centralized configuration facility that is able to automatically set or change the configurations of multiple endpoints of the VoIP network by transmitting a SIP message that includes the embedded configuration command. Consequently, a user or network operator does not need to manually configure the endpoints one-by-one through a local or remote interface, which is much more efficient.

One embodiment of the invention comprises configuring a plurality of SIP endpoints of a VoIP network. According to this embodiment, an application server of the VoIP network identifies an endpoint configuration for the SIP endpoints. The endpoint configuration may be designated by a network operator, by a network management system, or by another party or system. The application server generates a configuration command to configure the SIP endpoints according to the identified endpoint configuration. The application server formats a SIP message to include the configuration command. For instance, the application server may format a SIP OPTIONS message so that a configuration command is included in the XML body of the OPTIONS message. The application server then transmits the SIP message to the SIP endpoints.

Responsive to receiving the SIP message, the SIP endpoints process the SIP message to identify the configuration command. The SIP endpoints then set local configuration parameters based on the configuration command. Examples of local configuration parameters include a SIP application server IP address, SIP timers, audio/video CODECs, etc. The configuration command may permanently or temporarily set the local configuration parameters of the SIP endpoints so that the SIP endpoints are configured according to the commands of the application server.

The invention may include other exemplary embodiments described below.

DESCRIPTION OF THE DRAWINGS

The same reference number represents the same element or same type of element on all drawings.

FIG. 7 is a flow chart illustrating a method of operating a provisioning server in an exemplary embodiment of the invention.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
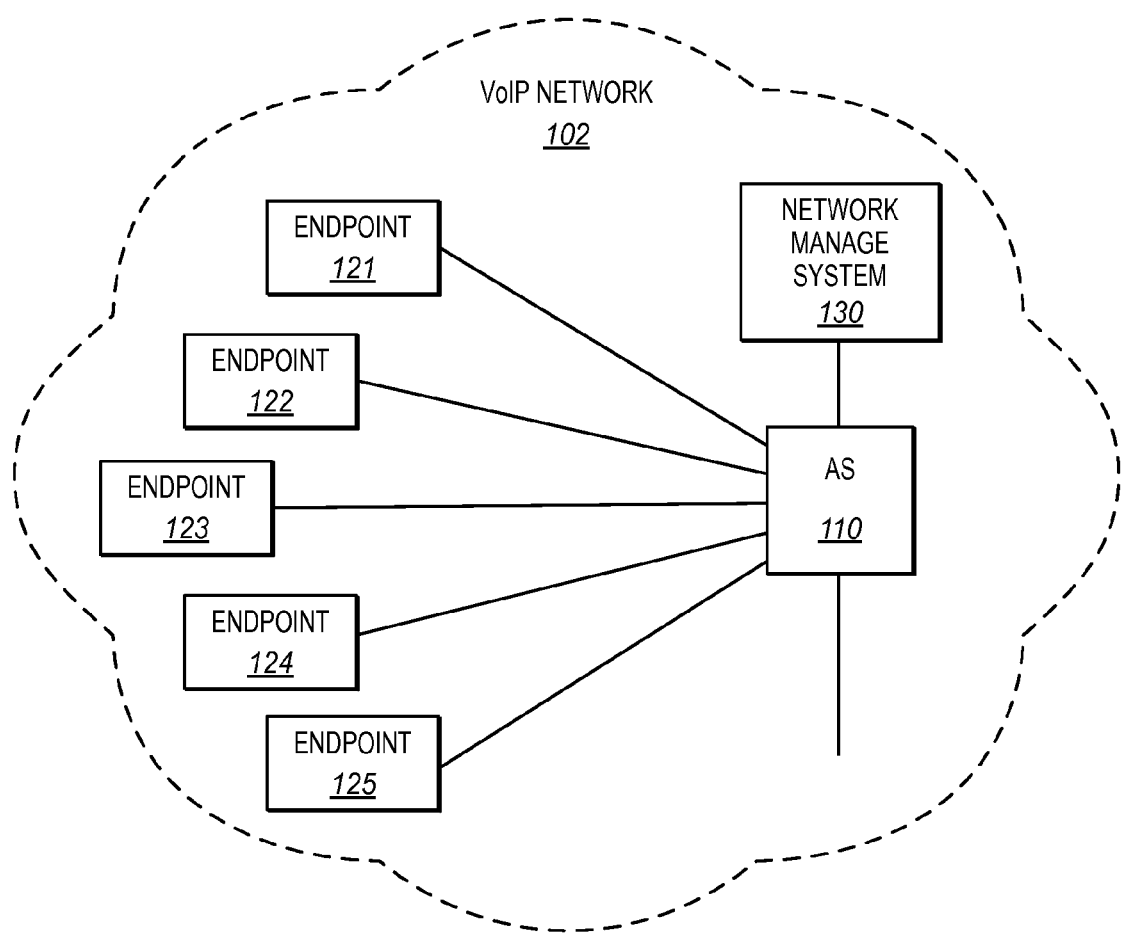
FIG. 1 illustrates a VoIP network in an exemplary embodiment of the invention.

FIG. 1 illustrates a VoIP network 102 in an exemplary embodiment of the invention. VoIP network 102 includes one or more application servers 110 and a plurality of endpoints 121-125. Application server (AS) 110 comprises any system or server adapted to manage endpoints in a VoIP network that register with it, and to provide call processing functionality. Endpoints 121-125 comprise any devices that implement functionality for initiating or terminating calls in a VoIP network. Examples of endpoints 121-125 are VoIP phones, PDAs, computers with VoIP functionality, etc. Endpoints 121-125 are adapted to implement SIP User Agent (UA) functionality for initiating or terminating calls. As such, endpoints 121-125 are referred to herein as SIP endpoints. SIP endpoints 121-125 may use other signaling protocols other than SIP in other embodiments. VoIP network 102 may also include network management system 130 that is adapted to monitor, control, and manage data communications in VoIP network 102.

Figure 2:
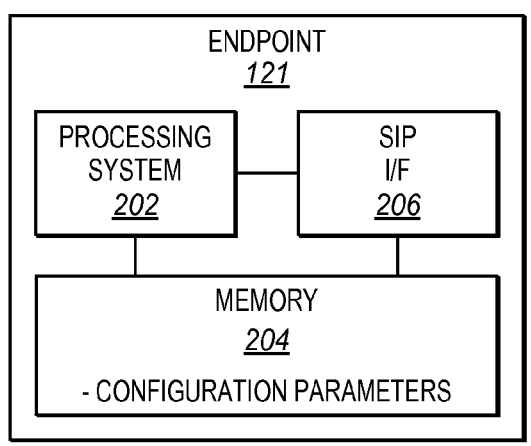
FIG. 2 illustrates a SIP endpoint in an exemplary embodiment of the invention.

FIG. 2 illustrates a SIP endpoint in an exemplary embodiment of the invention. FIG. 2 specifically illustrates SIP endpoint 121, but the other endpoints 122-125 may have similar structures and functionalities. SIP endpoint 121 includes a processing system 202, a memory 204, and a SIP interface 206. Processing system 202 comprises any processor or processors that are adapted to execute code or instructions to perform functions, such as initiating/receiving calls, interpreting configuration commands, etc. Memory 204 is adapted to store local configuration parameters that define the configuration for endpoint 121. For example, one configuration parameter may be an IP address for application server 110. Another configuration parameter may be SIP timers, such as a timer defining the retransmission rate of SIP messages. Another configuration parameter may be an audio/video compression/decompression (CODEC) scheme. Memory 204 may store other data, such as a call application that allows SIP endpoint 121 to initiate/receive calls. SIP interface 206 comprises any device, component, or system adapted to communicate with application server 110 or another server through SIP.

Before SIP endpoint 121, and the other SIP endpoints 122-125 are able to connect to VoIP network 102, the configuration parameters in SIP endpoint 121 have to be defined appropriately. Also, after SIP endpoints 121-125 are connected to VoIP network 102, it may be desirable to change the configuration of all or a subset of the SIP endpoints 121-125, such as responsive to changing conditions in VoIP network 102. For instance, if VoIP network 102 is experiencing high traffic volume, then it may be desirable to increase the SIP retransmission timers on SIP endpoints 121-125 to avoid unnecessary SIP retransmissions. When traffic volume returns to a normal level, then it may be desirable to return the SIP retransmission timers to their original value.

Figure 3:
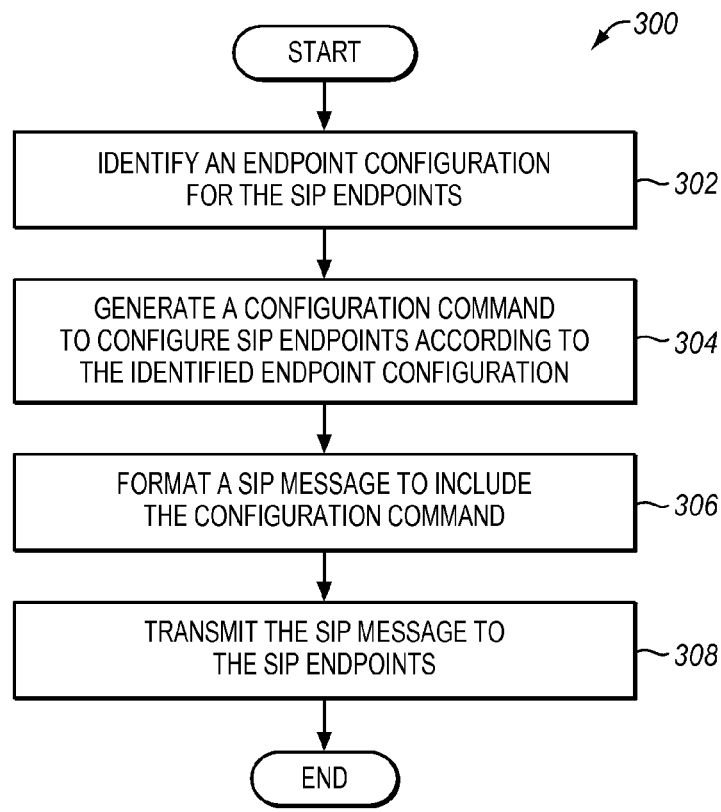
FIG. 3 is a flow chart illustrating a method of operating an application server in an exemplary embodiment of the invention.

Instead of configuring SIP endpoints 121-125 one-by-one as is presently done, VoIP network 102 in FIG. 1 uses application server 110 to transmit SIP messages to SIP endpoints 121-125 that include configuration commands. FIG. 3 is a flow chart illustrating a method 300 of operating an application server in an exemplary embodiment of the invention. The steps of method 300 will be described with reference to VoIP network 102 in FIG. 1. The steps of the flow chart in FIG. 3 are not all inclusive and may include other steps not shown.

In step 302 of method 300, application server 110 identifies an endpoint configuration for SIP endpoints 121-125. An endpoint configuration comprises any desired way of setting up endpoints of VoIP network 102 for connecting to, communicating with, or operating with VoIP network 102. A particular endpoint configuration may define values for one or more of the configuration parameters stored in endpoints 121-125 (see FIG. 2). Application server 110 may dynamically identify or determine an endpoint configuration based on conditions in VoIP network 102, such as network congestion, failures, etc. Application server 110 may also identify an endpoint configuration based on input from network operators or other entities. For instance, application server 110 may receive information on the endpoint configuration from network management system 130. Application server 110 may also identify an endpoint configuration responsive to one or more new endpoints attempting to register with application server 110.

In step 304, application server 110 generates a configuration command to configure SIP endpoints 121-125 according to the identified endpoint configuration. In step 306, application server 110 formats a SIP message to include the configuration command (i.e., the configuration command is included in or embedded in the SIP message). As an example, application server 110 may format a SIP OPTIONS message so that the configuration command is included in or embedded in the XML body of the OPTIONS message. In step 308, application server 110 transmits the SIP message to SIP endpoints 121-125. Application server 110 may perform a point-to-point transmission, or may perform a point-to-multipoint transmission (broadcast) to transmit the SIP message to SIP endpoints 121-125.

Application server 110 may transmit the SIP message to configure all of SIP endpoints 121-125 in VoIP network 102. For instance, application server 110 may identify a global configuration change that needs to be made in all of SIP endpoints 121-125. Alternatively, application server 110 may transmit the SIP message to configure a subset of SIP endpoints 121-125. If configuring a subset, application server 110 may identify which of the SIP endpoints 121-125 to configure (i.e., which SIP endpoints 121-125 should receive a configuration command) in addition to identifying the desired endpoint configuration for endpoints 121-125.

For instance, if a region of VoIP network 102 is experiencing congestion, then application server 110 may identify a configuration change that needs to be made in the subset of SIP endpoints 121-125 that are located in that region. Application server 110 may then transmit the SIP message that includes the configuration command to the identified subset of SIP endpoints 121-125.

Figure 4:
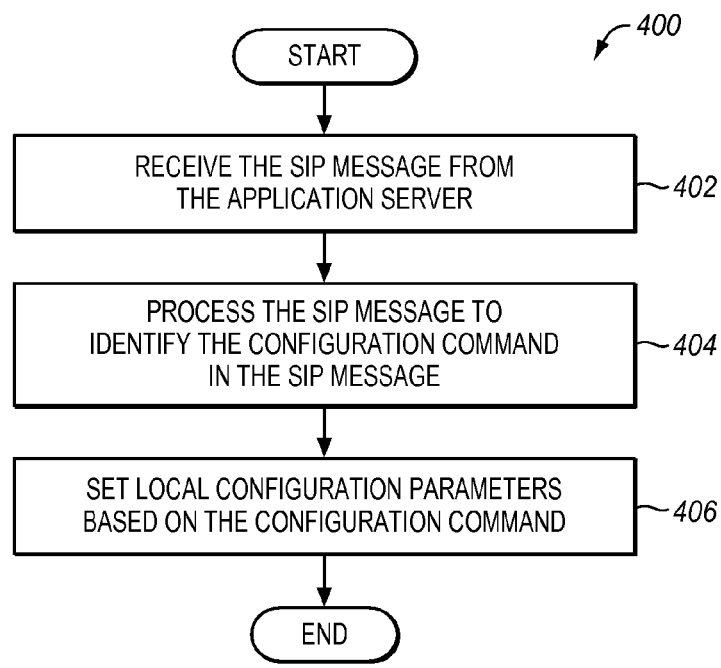
FIG. 4 is a flow chart illustrating a method of operating a SIP endpoint in an exemplary embodiment of the invention.

FIG. 4 is a flow chart illustrating a method 400 of operating a SIP endpoint in an exemplary embodiment of the invention. The steps of method 400 will be described with reference to VoIP network 102 in FIG. 1 and SIP endpoint 121 in FIG. 2. The steps of the flow chart in FIG. 4 are not all inclusive and may include other steps not shown.

In step 402 of method 400, SIP interface 206 in endpoint 121 receives the SIP message from application server 110. In step 404, processing system 202 processes the SIP message to identify the configuration command that was included in or embedded in the SIP message. In step 406, processing system 206 sets the local configuration parameters stored in memory 204 based on the configuration command. Setting the local configuration parameters may comprise adding configuration parameters, modifying configuration parameters, or deleting confirmation parameters. Processing system 202 may also respond to the SIP message from application server 110, such as with a SIP 200 OK message.

Processing system 206 may temporarily or permanently set the local configuration parameters. Temporary parameter settings last for a particular duration, such as a specified time period or until the next power cycle for endpoint 121. Permanent parameters settings last until the parameter is again changed through some means, such as through SIP messaging as described herein, through a local configuration interface, through an HTTP-based web interface, etc.

When the local configuration parameters are set based on the configuration command, SIP endpoint 121 operates according to the configuration provided by application server 110. Method 400 may also be performed in other SIP endpoints 122-125 that receive the SIP message.

The process illustrated in FIGS. 3-4 may be used to initially configure SIP endpoints 121-125 so that they may connect to and operate with VoIP network 102. The configuration command would thus initially define the values for the configuration parameters. This process may also be used to change the configuration of SIP endpoints 121-125. The configuration command would thus change or update the values for the configuration parameters. Application server 110 can advantageously configure multiple SIP endpoints 121-125 in VoIP network 102 by transmitting the SIP messages to the endpoints. SIP endpoints 121-125 do not need to be configured one-by-one as before, which makes the process of configuring multiple endpoints much more efficiently.

Figure 5:
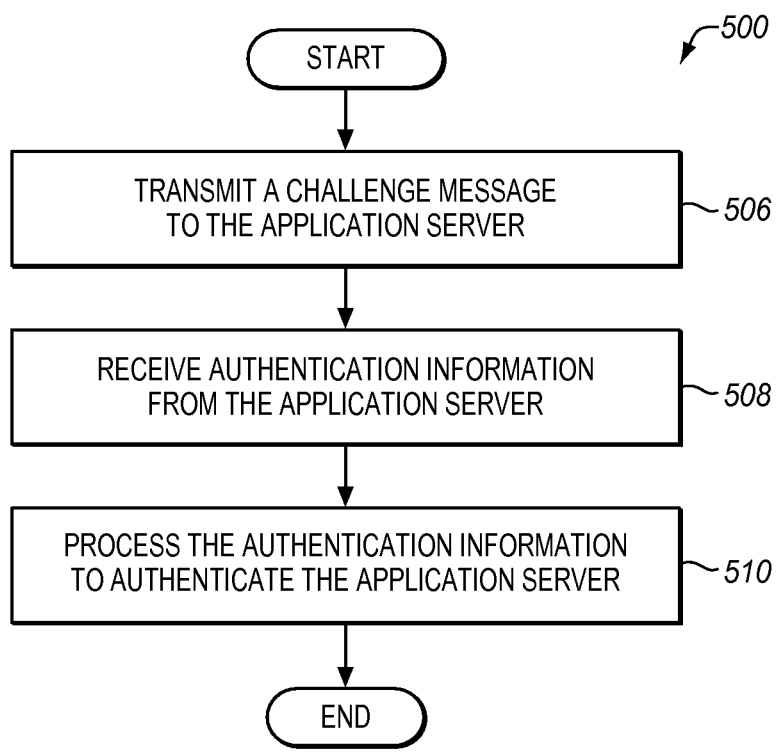
FIG. 5 is a flow chart illustrating a method of authenticating an application server in an exemplary embodiment of the invention.

Before a SIP endpoint 121 changes its configuration based on the command of application server 110, the endpoint 121 may authenticate application server 110. FIG. 5 is a flow chart illustrating a method 500 of authenticating an application server in an exemplary embodiment of the invention. The steps of method 500 will be described with reference to VoIP network 102 in FIG. 1 and SIP endpoint 121 in FIG. 2. The steps of the flow chart in FIG. 5 are not all inclusive and may include other steps not shown.

Before updating or changing the configuration of endpoint 121 responsive to the configuration command, processing system 202 transmits a challenge message to application server 110 through SIP interface 206 in step 506. The challenge message may comprise a SIP 401 UNAUTHORIZED message that includes challenge information. In step 508, processing system 202 receives authentication information from application server 110 through SIP interface 206 responsive to the challenge message. To provide the authentication information, application server 110 may generate another SIP OPTIONS message that includes the original configuration command and also includes authorization information (e.g., a login and password). In step 510, processing system 202 processes the authentication information to authenticate application server 110 as a system authorized to provide configuration changes. If application server 110 is authenticated, then processing system 202 sets the local configuration parameters based on the configuration command in step 406 as is done in FIG. 4.

As described in the above embodiments, application server 110 (see FIG. 1) may embed the configuration command in a SIP OPTIONS message. More particularly, a new content type (application/endpoint-configuration+XML) may be defined for XML data of a SIP OPTIONS message in which to embed the configuration command. The following illustrates an exemplary SIP OPTIONS message and associated configuration command in the XML data to change a SIP retransmission timer to 1.5 seconds. The new data in the SIP OPTIONS message is indicated in bold.

```
OPTIONS sip:voipnetwork.enterprise.com:5060;user=phone SIP/2.0
Via: SIP/2.0/UDP 10.86.9.26:5060;branch=z9hG4bK421eb
From: "SIP AS" <sip:as.voipnetwork.com:5060>;tag=15c31
To: "Joe Smith" <sip:7135521@voipnetwork.com:5060>
Call-ID: UNSET000.20050224.073704.1@10.86.9.26
CSeq: 1234 OPTIONS
Supported: timer
Expires: 3600
Contact: <sip:10.86.9.26:5060>
Content-Type: application/endpoint-configuration+xml
Content-Length: 181
<?xml version="1.0" encoding="UTF-8">
<EndpointConfiguration>
<command type="change" apply="permanent">
<name>SIP.timer.t1</name>
<value>1500ms</value>
</command>
</EndpointConfiguration>
```

The following illustrates an exemplary SIP 200 OK message that endpoint 121 may transmit back to application server 110 responsive to the above SIP OPTIONS message. The new data in the SIP 200 OK message is indicated in bold.

```
SIP/2.0 200 OK
Via: SIP/2.0/UDP 10.86.9.26:5060;branch=z9hG4bK421eb
From: "SIP AS" <sip:7135521@voipnetwork.com:5060>;tag=15c31
To: "Joe Smith" <sip:7135521@voipnetwork.com:5060>;tag=23d23
Call-ID: UNSET000.20050224.073704.1@10.86.9.26
CSeq: 1234 OPTIONS
Contact: <sip:7135521@10.86.9.26:5060;user=phone>
Content-Type: application/endpoint-configuration+xml
Content-Length: 174
<?xml version="1.0" encoding="UTF-8">
<EndpointConfiguration>
<result value="OK">
<description>SIP.timer.t1 was changed to 1500 ms</description>
</result>
</EndpointConfiguration>
```

Some SIP endpoints may not be operable to handle the configuration command as provided by application server 110 in a SIP message. In such a scenario, application server 110 may transmit the SIP message, that includes the configuration command, to an HTTP-based provisioning server, which is adapted to convert the configuration command in the SIP message to an HTTP configuration command.

Figure 6:
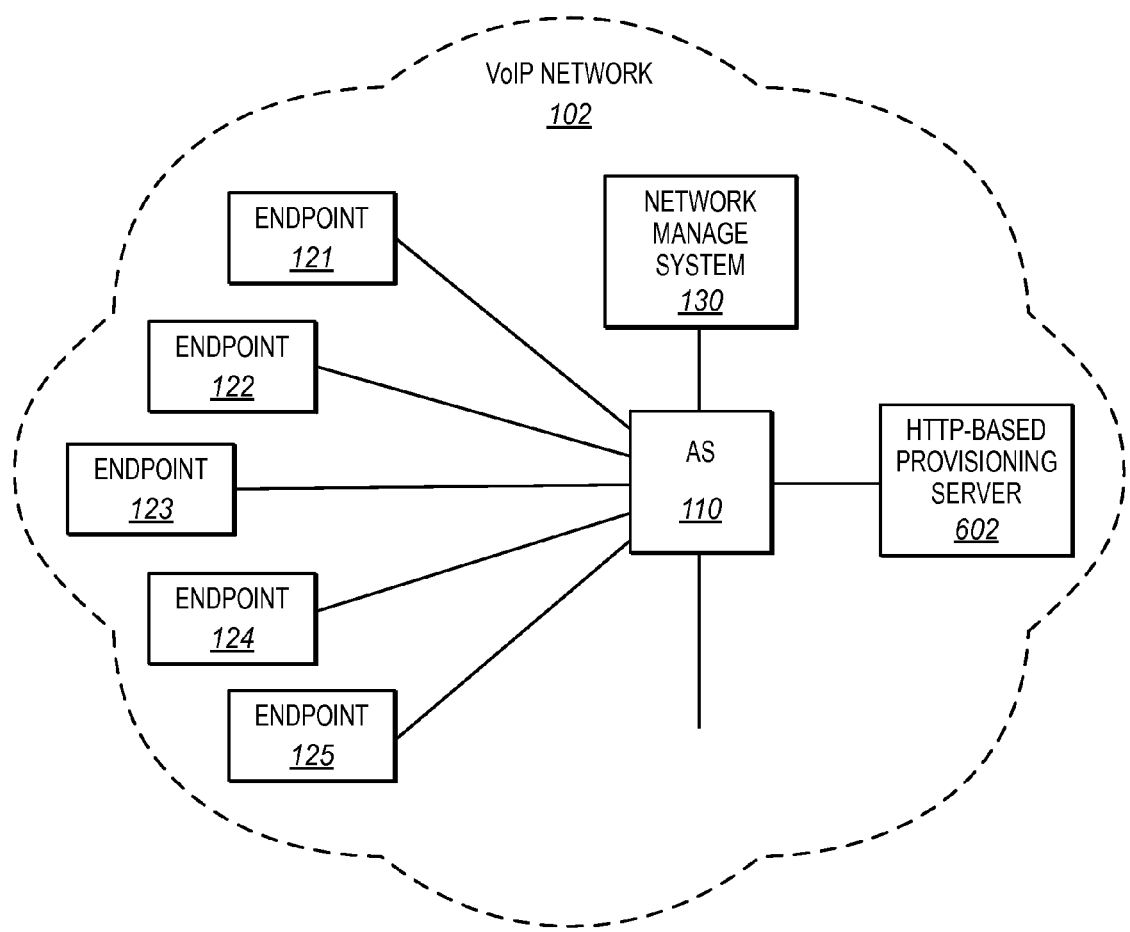
FIG. 6 illustrates a VoIP network that further includes an HTTP-based provisioning server in an exemplary embodiment of the invention.

FIG. 6 illustrates a VoIP network that further includes an HTTP-based provisioning server in an exemplary embodiment of the invention. The VoIP network 102 in FIG. 6 resembles VoIP network 102 in FIG. 1 with the addition of HTTP-based provisioning server 602. Provisioning server 602 comprises any system or server adapted to provide HTTP configuration commands to a SIP endpoint through a web-based interface.

Assume for example that application server 110 transmits a SIP message that includes the configuration command to one or more SIP endpoints, and the SIP endpoints are not operable to handle the configuration command as provided in the SIP message. For instance, the SIP endpoints may not be adapted to process the XML data in the SIP message to identify the configuration command. Application server 110 may then receive a SIP 400 message or another SIP message from the SIP endpoints indicating that the SIP endpoints are not able to process the configuration command. Responsive to the reply from the SIP endpoints, application server 110 may transmit the SIP message (e.g., SIP OPTIONS message) that includes the configuration command to provisioning server 602. Provisioning server 602 may then operate as follows.

FIG. 7 is a flow chart illustrating a method 700 of operating a provisioning server in an exemplary embodiment of the invention. The steps of method 700 will be described with reference to VoIP network 102 in FIG. 6. The steps of the flow chart in FIG. 7 are not all inclusive and may include other steps not shown.

In step 702 of method 700, provisioning server 602 processes the SIP message to identify the configuration command. Provisioning server 602 then converts the configuration command in the SIP message to an HTTP configuration command in step 704. To convert the configuration command in the SIP message, provisioning server 602 maps fields from the configuration command in the SIP message to fields of an HTTP configuration command. The HTTP configuration command may be the traditional command used to configure a VoIP endpoint through a web-based interface. In step 706, provisioning server 602 transmits the HTTP configuration command to the SIP endpoints. The SIP endpoints, such as endpoints 121-125, then set their local configuration parameters based on the HTTP configuration command.

Although specific embodiments were described herein, the scope of the invention is not limited to those specific embodiments. The scope of the invention is defined by the following claims and any equivalents thereof.

We claim:

1. A VoIP network, comprising:
a plurality of SIP endpoints that are initially unable to connect to the VoIP network;
an application server adapted to identify an endpoint configuration for applying to the SIP endpoints that includes an Internet Protocol (IP) address of a SIP application server, to generate a single configuration command to configure all of the SIP endpoints according to the identified endpoint configuration, to format a SIP OPTIONS message to include the configuration command, wherein the SIP OPTIONS message includes a content type, defined for Extensible Markup Language (XML), that is dedicated exclusively to endpoint configurations, the application server is further adapted to broadcast the SIP OPTIONS message to all of the SIP endpoints in order to configure all of the SIP endpoints at once;
for the SIP endpoints receiving the SIP OPTIONS message, the SIP endpoints are adapted to process the SIP OPTIONS message to identify the configuration command, to set local configuration parameters that enable the SIP endpoints to connect to the VoIP network based on the configuration command, and to transmit a response to the SIP application server; and
an HTTP-based provisioning server, wherein:
the application server is further adapted to transmit the SIP OPTIONS message to the HTTP-based provisioning server;
the HTTP-based provisioning server is adapted to process the SIP OPTIONS message to identify the configuration command, to convert the configuration command in the SIP OPTIONS message to an HTTP configuration command, and to transmit the HTTP configuration command to the SIP endpoints; and
for the SIP endpoints receiving the HTTP configuration command, the SIP endpoints are adapted to set the local configuration parameters based on the HTTP configuration command.

2. The VoIP network of claim 1 wherein:
the SIP endpoints are adapted to set the local configuration parameters permanently based on the configuration command.

3. The VoIP network of claim 1 wherein:
the SIP endpoints are adapted to set local configuration parameters that define how to contact the application server based on the configuration command.

4. The VoIP network of claim 1 wherein:
the SIP endpoints are further adapted to set local configuration parameters that comprise a SIP timer for the SIP endpoint.

5. The VoIP network of claim 1 further comprising a network management system adapted to transmit information on the endpoint configuration for the SIP endpoints to the application server.

6. The VoIP network of claim 1 wherein:
the SIP endpoints are further adapted to transmit a challenge message to the application server responsive to receiving the SIP OPTIONS message that includes the configuration command;
the application server is further adapted to transmit authentication information to the SIP endpoints responsive to the challenge message; and
the SIP endpoints are further adapted to process the authentication information to authenticate the application server, and to set the local configuration parameters based on the configuration command responsive to authenticating the application server.

7. A method of operating a VoIP network having a plurality of SIP endpoints and an application server, the method comprising:
identifying, in the application server, an endpoint configuration that includes an Internet Protocol (IP) address of the application server for applying to the SIP endpoints, where the SIP endpoints are presently unable to connect to the VoIP network;
generating a single configuration command to configure all of the SIP endpoints according to the identified endpoint configuration;
formatting a SIP OPTIONS message to include the configuration command, wherein the SIP OPTIONS message includes a content type, defined for Extensible Markup Language (XML), that is dedicated exclusively to endpoint configurations;

broadcasting the SIP OPTIONS message to all of the SIP endpoints in order to configure all of the SIP endpoints at once;

for the SIP endpoints receiving the SIP OPTIONS message, the method further comprises:
processing the SIP OPTIONS message in the SIP endpoints to identify the configuration command;
setting local configuration parameters in the SIP endpoints that enable the SIP endpoints to connect to the VoIP network based on the configuration command; and
transmitting a response to the application server;

transmitting the SIP OPTIONS message from the application server to an HTTP-based provisioning server;

processing the SIP OPTIONS message in the HTTP-based provisioning server to identify the configuration command;

converting the configuration command in the SIP OPTIONS message to an HTTP configuration command;

transmitting the HTTP configuration command from the HTTP-based provisioning server to the SIP endpoints; and for the SIP endpoints receiving the HTTP configuration command, the method further comprises setting the local configuration parameters based on the HTTP configuration command.

8. The method of claim 7 wherein setting local configuration parameters in the SIP endpoints based on the configuration command comprises:
permanently setting the local configuration parameters in the SIP endpoints based on the configuration command.

9. The method of claim 7 wherein setting local configuration parameters in the SIP endpoints based on the configuration command comprises:
setting local configuration parameters that define how to contact the application server based on the configuration command.

10. The method of claim 7 further comprising:
transmitting information on the endpoint configuration for the SIP endpoints from a network management system to the application server.

11. The method of claim 7 further comprising:
transmitting a challenge message from one of the SIP endpoints to the application server responsive to the one SIP endpoint receiving the SIP OPTIONS message that includes the configuration command;
transmitting authentication information from the application server to the one SIP endpoint responsive to the challenge message;
processing the authentication information in the one SIP endpoint to authenticate the application server; and
setting the local configuration parameters based on the configuration command in the one SIP endpoint responsive to authenticating the application server.

12. A method of operating an application server of a VoIP network, the method comprising:
identifying an endpoint configuration for applying to a plurality of SIP endpoints, wherein the endpoint configuration includes an Internet Protocol (IP) address of the application server for the SIP endpoints, and the SIP endpoints are presently unable to connect to the VoIP network;
generating a configuration command to configure the SIP endpoints according to the identified endpoint configuration to enable the SIP endpoints to connect to the VoIP network; formatting a SIP OPTIONS message to include the configuration command, wherein the SIP OPTIONS message includes a content type, defined for Extensible Markup Language (XML), that is dedicated exclusively to endpoint configurations;
broadcasting the SIP OPTIONS message to the SIP endpoints in order to configure all of the SIP endpoints at once;
receiving a response from each of the SIP endpoints;
transmitting the SIP OPTIONS message from the application server to an HTTP-based provisioning server;
processing the SIP OPTIONS message in the HTTP-based provisioning server to identify the configuration command;
converting the configuration command in the SIP OPTIONS message to an HTTP configuration command;
transmitting the HTTP configuration command from the HTTP-based provisioning server to the SIP endpoints; and
for the SIP endpoints receiving the HTTP configuration command, the method further comprises setting the local configuration parameters based on the HTTP configuration command.

13. The method of claim 12 further comprising:
receiving a challenge message from one of the SIP endpoints responsive to the one SIP endpoint receiving the SIP OPTIONS message that includes the configuration command; and
transmitting authentication information to the one SIP endpoint responsive to the challenge message.

14. A method of operating SIP endpoints of a VoIP network, the method comprising:
receiving, at the SIP endpoints, a SIP OPTIONS message broadcast from an application server that includes a configuration command indicating an Internet Protocol (IP) address of a SIP application server for the SIP endpoint, wherein the SIP OPTIONS message includes a content type, defined for Extensible Markup Language (XML), that is dedicated exclusively to endpoint configurations, and where the SIP endpoints are presently unable to connect to the VoIP network;
processing, at each of the SIP endpoints, the SIP OPTIONS message to identify the configuration command;
setting, at each of the SIP endpoints, local configuration parameters based on the configuration command;
transmitting, via each of the SIP endpoints, a response to the application server;
transmitting the SIP OPTIONS message from the application server to an HTTP-based provisioning server;
processing the SIP OPTIONS message in the HTTP-based provisioning server to identify the configuration command;
converting the configuration command in the SIP OPTIONS message to an HTTP configuration command;
transmitting the HTTP configuration command from the HTTP-based provisioning server to the SIP endpoints; and
for the SIP endpoints receiving the HTTP configuration command, the method further comprises setting the local configuration parameters based on the HTTP configuration command.

15. The method of claim 14 wherein setting local configuration parameters based on the configuration command comprises:
  permanently setting the local configuration parameters based on the configuration command.

16. The method of claim 14 wherein setting local configuration parameters based on the configuration command comprises:
  setting local configuration parameters that define how to contact the application server based on the configuration command.

17. The method of claim 14 further comprising:
  transmitting a challenge message to the application server responsive receiving the SIP OPTIONS message that includes the configuration command;
  receiving authentication information from the application server responsive to the challenge message;
  processing the authentication information to authenticate the application server; and
  setting the local configuration parameters based on the configuration command responsive to authenticating the application server.

* * * * *